United States Patent Office 3,489,768
Patented Jan. 13, 1970

3,489,768
INDOLE-4-ACETIC ACID COMPOUNDS
Franklin Willard Short, Saline, Mich., and Roxanne Margaret Drnevich, Lexington, Ky., assignors to Parke Davis & Company, Detroit, Mich., a corporation of Michigan
No Drawing. Continuation-in-part of application Ser. No. 617,864, Feb. 23, 1967. This application Feb. 8, 1968, Ser. No. 703,888
Int. Cl. C07d 27/56; A61k 27/00
U.S. Cl. 260—326.13                6 Claims

ABSTRACT OF THE DISCLOSURE

Indole-4-acetic acids and salts thereof, substituted in the 1-position by phenyl, mono(halo)phenyl, 2,3-dichlorophenyl, 2,4-dichlorophenyl, mono(lower alkyl)phenyl, methoxyphenyl, or cyclohexyl, optionally substituted in the 2-position by lower alkyl or phenyl, optionally substituted in the 3-, 5-, and 6-positions by methyl, and optionally substituted on the α-carbon by lower alkyl; corresponding indoline derivatives; and the production of these compounds by hydrolysis of a correspondingly substituted lower alkyl ester precursor. The compounds are useful as pharmacological agents having anti-inflammatory activity.

CROSS REFERENCE TO RELATED APPLICATION

This application is a continuation-in-part of co-pending application Ser. No. 617,864, filed Feb. 23, 1967, now abandoned.

SUMMARY AND DETAILED DESCRIPTION

The present invention relates to new indole-4-acetic acid compounds and salts thereof that are useful as pharmacological agents and to methods for their production. More particularly, the invention relates to new 1-substituted indole-4-acetic acid compounds that are represented by the formula

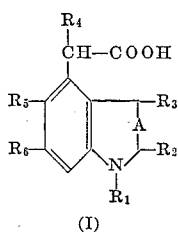

(I)

and to pharmaceutically-acceptable salts thereof; where $R_1$ is phenyl, mono(halo)phenyl, 2,3-dichlorophenyl, 2,4-dichlorophenyl, mono(lower alkyl)phenyl, methoxyphenyl, or cyclohexyl; $R_2$ is hydrogen, lower alkyl, or phenyl; $R_4$ is hydrogen or lower alkyl; each of $R_3$, $R_5$, and $R_6$ is hydrogen or methyl, with the further proviso that not more than one of $R_3$, $R_5$, and $R_6$ is methyl; and A represents a single bond or a double bond. The lower alkyl groups in the foregoing formula are those containing not more than four carbon atoms, and the preferred such group is methyl.

In accordance with the invention, compounds having the foregoing formula and salts thereof are produced by hydrolyzing an ester compound having the formula

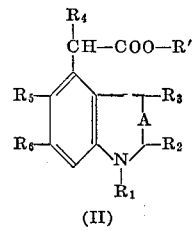

(II)

where $R_1$, $R_2$, $R_3$, $R_4$, $R_5$, $R_6$, and A are as defined earlier; and $R'$ represents lower alkyl, preferably methyl or ethyl. This hydrolysis reaction can be carried out under either acidic or alkaline conditions, by the use of an acidic or basic hydrolytic agent. Alkaline conditions are preferred. The hydrolysis can be carried out in water or in an aqueous solution of an unreactive water-miscible, organic solvent, such as an aliphatic alcohol, dioxane, tetrahydrofuran, ethylene glycol, propylene glycol, or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids, such as p-toluenesulfonic acid, and acidic ion exchange resins. Preferred agents are alkali metal hydroxides, such as sodium hydroxide or potassium hydroxide. The hydrolytic agent is normally employed in a considerable excess.

The hydrolysis is carried out by heating a solution or suspension of the starting material in a solvent medium containing an acid or a base until hydrolysis is substantially complete. In general, the reaction is carried out at a temperature between about 0 and 120° C., or at the reflux temperature of the solvent, during a period that may vary from about one to about 60 hours. When one of the preferred basic hydrolytic agents is employed, the reaction is usually carried out at a temperature between about room temperature and 100° C., and is substantially complete after a period of from 2 to 20 hours, depending somewhat on the specific structure of starting ester compound.

When the hydrolysis is carried out under alkaline conditions, the product is present in the reaction mixture in the form of a salt; and it can be isolated in this form, or following treatment with an acid, preferably a mineral acid, it can be isolated as the free acid. When the hydrolysis is carried out under acidic conditions, the product is present in the reaction mixture as the free acid and it can be isolated directly in this form, or by subsequent treatment with a base, it can be isolated in salt form.

The ester compounds having Formula II above that are used as starting materials in the foregoing process can be prepared in a number of ways. In general, most of the required esters are prepared by reaction of a 6,7-dihydroindol-4(5H)-one compound having the formula

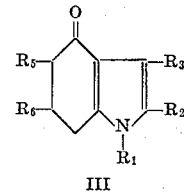

III with an α-haloacetic acid ester having the formula

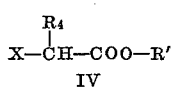
IV in the presence of zinc, followed by treatment of the reaction product with a strong acid, such as sulfuric acid, to produce a 6,7-dihydroindole-4-acetic acid ester compound or a 6,7-dihydroindole-$\Delta^{4(5H),\alpha}$-acetic acid ester compound or a mixture of both that can be represented by the formula

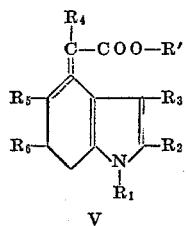
V which ester or mixture of esters is heated at an elevated temperature in a high-boiling unreactive solvent in the presence of a dehydrogenating agent, such as palladium-on-carbon, chloranil, or sulfur, to produce an indol-4-acetic acid ester compound having the formula

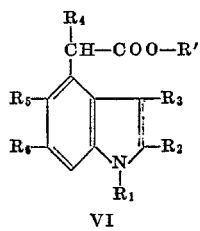
VI

In the foregoing Formulas III, IV, V, and VI, the symbols $R_1$, $R_2$, $R_3$, $R_4$, $R_5$, $R_6$, and R' have the same meaning as previously given and X represents chlorine, bromine, or iodine. In Formula V above, the dotted lines are meant to represent both intermediate esters and also to show that the product represented thereby is, in certain cases, particularly when $R_4$ is lower alkyl, a mixture consisting of an ester having an endocyclic double bond and a corresponding ester having an exocyclic double bond.

For the preparation of a starting indoline ester compound, that is, an ester compound having Formula II above wherein A represents a single bond, an indol-4-acetic acid compound having the formula

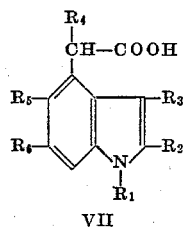
VII may be catalytically hydrogenated employing gaseous hydrogen in the presence of platinum oxide and fluoboric acid in a lower alkanol solvent; where $R_1$, $R_2$, $R_3$, $R_4$, $R_5$, and $R_6$ are as defined earlier.

The intermediate 6,7-dihydroindol-4(5H)-one compounds having Formula III above are in general prepared by reacting 4,5,6,7-tetrahydro-4-oxo-3-benzofurancarboxylic acid, 4,5,6,7-tetrahydro-3-methyl-4-oxo-2-benzofurancarboxylic acid, or 4,5,6,7-tetrahydro-4-oxo-6-methyl-3-benzofurancarboxylic acid with an amine compound having the formula

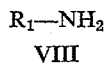
VIII followed by treatment of the resulting 4,5,6,7-tetrahydro-4-iminoindole compound have the formula

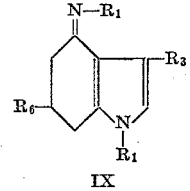
IX with acid to give a 6,7-dihydroindol-4(5H)-one compound having the formula

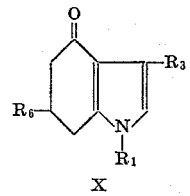
X or alternatively, by reaction of a 1,3-cyclohexane-dione compound having the formula

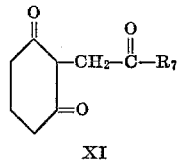
XI with an amine compound having Formula VIII above in acetic acid to give a 6,7-dihydroindol-4(5H)-one compound having the formula

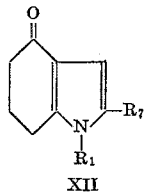
XII

In the foregoing Formulas VIII, IX, X, XI, and XII, $R_1$, $R_3$, and $R_6$ have the same meaning as given earlier, and $R_7$ is lower alkyl or phenyl. When $R_1$ in Formula VIII is cyclohexyl, an iminoindole intermediate of Formula IX is not isolated, and the 6,7-dihydroindol-4(5H)-one compound of Formula X is obtained directly from the reaction described above. In some instances the product of the reaction of one of the benzofurancarboxylic acids with the amine of Formula VIII is a mixture of the 4,5,6,7-tetrahydro-4-iminoindole of Formula IX and the 6,7-dihydroindol-4(5H)-one of Formula X, which mixture is readily separated into its components and the imino compound converted to the ketone as indicated above.

The preparation of specific starting materials and intermediates therefor is described in detail in the examples section that follows.

The compounds of the invention can exist in free acid or salt form. Pharmaceutically-acceptable salts are formed as described above or by reaction of the free acid compound with a variety of organic and inorganic bases. Some examples of suitable bases are sodium hydroxide, potassium hydroxide, calcium hydroxide, aluminum hydroxide, sodium carbonate, potassium carbonate, potassium bicarbonate, choline, 2-hydroxyethylamine, diethanolamine, ammonia, and diethylamine. The preferred salts of the invention are the pharmaceutically-acceptable salts of an alkali metal, an alkaline earth metal, ammonia, or a substituted ammonia. The salts differ in solubility properties from the free acids, but are otherwise equivalent for the purposes of the invention.

The compounds of the invention are new chemical compounds that are useful as pharmacological agents, especially as anti-inflammatory agents that can be used in the relief of inflammatory conditions as well as in the prevention or suppression of the occurrence of inflammation. Their anti-inflammatory activity is demonstrable and quantitatively measurable in a test designed to measure the ability of a test compound to delay the normal appearance of an erythema in animals exposed to ultraviolet radiation under standardized conditions. The test procedure that is used has been described by Winder, Wax, Burr, Been, and Rosiere in Archives Internationales de Pharmacodynamie et de Therapie, vol. 116, pages 261–292, 1958. This test has been found to be a reliable indicator of anti-inflammatory activity, as demonstrated, for example, for the known clinically useful agents, aminopyrine, antipyrine, and aspirin. In this standard test procedure, 1 - phenylindole - 4 - acetic acid and 1 - (o-chlorophenyl)-indole-4-acetic acid were found to be effective at a does of 0.1 mg./kg. and 0.2 mg./kg., respectively. The compounds of the invention are preferably administered by the oral route although parenteral administartion can also be used. They can be employed in either free acid or salt form and can be combined with either a solid or liquid carrier or diluent and made available in varying amounts in such pharmaceutical forms as tablets, capsules, powders, and aqueous and nonaqueous suspensions and solutions.

In addition to the free acids and salts of the invention, the ester compounds described herein have also been found to possess anti-inflammatory activity. These ester compounds, while somewhat less active than the free acids and salts, possess relatively low toxicity, and because of their relatively high solubility in non-polar solvents, such as corn oil, can be used to advantage in pharmaceutical forms where high oil solubility is desired.

The invention is illustrated by the following examples.

EXAMPLE 1

A solution prepared by warming a mixture consisting of 18.3 g. of ethyl 1-phenylindole-4-acetate, 6.6 g. of potassium hydroxide, 180 ml. of methanol, and 35 ml. of water is kept at room temperature for 17 hours, evaporated to remove methanol, and the residue diluted with 150 ml. of water. The aqueous solution is extracted twice with ether and acidified with dilute hydrochloric acid to yield a precipitate of 1-phenylindole-4-acetic acid, which is isolated, dried, and crystallized from benzene-hexane; M.P. 112.5–114° C.

In a similar manner, but employing 4.5 g. of methyl 1-(o-chlorophenyl)indole-4-acetate, 2.0 g. of potassium hydroxide, 38 ml. of methanol, and 7 ml. of water, there is obtained 1-(o-chlorophenyl)indole-4-acetic acid; M.P. 152–154° C., following crystallization from methanol.

A solution of 2.51 g. of 1-phenylindole-4-acetic acid in 50 ml. of methanol is treated with 0.69 g. of potassium carbonate in portions, and the resulting mixture is heated under reflux for 30 minutes and evaporated to dryness under reduced pressure to give 1-phenylindole-4-acetic acid potassium salt.

A solution of 1.5 g. of ammonia in 10 ml. of ethanol is added to a hot solution of 2.5 g. of 1-phenylindole-4-acetic acid in 25 ml. of ethanol, and the resulting mixture is evaporated to dryness to give 1-phenylindole-4-acetic acid ammonium salt as a white solid. The diethylamine salt is prepared similarly by substituting 2.0 g. of diethylamine for the ammonia.

The ethyl 1-phenylindole-4-acetate used as starting material in the foregoing procedure is prepared as follows.

A solution of 25.2 g. of 4,5,6,7-tetrahydro-4-oxo-3-benzofurancarboxylic acid in 125 ml. of aniline is heated under reflux in a nitrogen atmosphere for 22 hours, cooled, and poured into a mixture of 150 ml. of concentrated hydrochloric acid and 200 ml. of ice-water. The resulting aqueous mixture is extracted with four 200-ml. portions of chloroform, and the combined chloroform extracts are shaken with 400 ml. of 0.5 N aqueous sodium hydroxide and with two 200-ml. portions of water, dried, and evaporated to dryness to give 4,5,6,7-tetrahydro-1-phenyl-4-(phenylimino)indole; M.P. 130–131° C., following crystallization from ethanol.

A mixture consisting of 30.65 g. of 4,5,6,7-tetrahydro-1-phenyl-4-(phenylimino)indole, 25 ml. of concentrated hydrochloric acid, 50 ml. of water and 75 ml. of acetic acid is heated under reflux for 4 hours, cooled, and extracted successively with benzene and with ether. The combined extracts are washed with water, dried, an evaporated to give 6,7-dihydro-1-phenylindol-4(5H)-one; M.P. 98–101° C. following crystallization from benzene-hexane.

To a mixture consisting of 21.1 g. of 6,7-dihydro-1-phenylindol-4(5H)-one, 33.4 g. of ethyl bromoacetate, 100 ml. of ether, and 300 ml. of benzene is added 33.4 g. of zinc (20 mesh; activated by treatment with 1 N hydrochloric acid), and the resulting suspension is stirred vigorously under reflux for a total period of five hours. After the first hour, four additions of 8 g. each of zinc and 4.2 g. of ethyl bromoacetate are made at 45-minute intervals. After cooling, the reaction mixture is stirred for 30 minutes with a solution of 40 ml. of concentrated sulfuric acid in 400 ml. of water. The organic phase is separated, washed with water until neutral, dried, and concentrated to an oily residue, which is purified by chromatography on a column prepared from activated magnesium silicate (Florisil). The desired ethyl 6,7-dihydro-1-phenylindole-$\Delta^{4(5H),\alpha}$-acetate is obtained by eluting the column with benzene and with a 5% ether-in-benzene mixture and evaporating the eluates under reduced pressure; M.P. 61–64° C., following crystallization from aqueous ethanol.

A mixture consisting of 18.45 g. of ethyl 6,7-dihydro-1-phenylindole-$\Delta^{4(5H),\alpha}$-acetate, 1.8 g. of 20% palladium-on-carbon, and 180 ml. of mesitylene is heated under reflux for 16 hours, cooled, filtered to remove catalyst, and evaporated to dryness to give a residue of ethyl 1-phenylindole-4-acetate, suitable for use without further purification.

The methyl 1 - (o - chlorophenyl)indole - 4 - acetate starting material is obtained from the following reactions by employing procedures similar to those described above. 4,5,6,7 - tetrahydro - 4 - oxo - 3 - benzofurancarboxylic acid is first reacted with o-chloroaniline to give, following treatment of the initial reaction product mixture in chloroform with aqueous hydrochloric acid, an oily product mixture consisting of 4,5,6,7 - tetrahydro - 1 - (o - chlorophenyl) - 4 - (o - chlorophenylimino)indole and 6,7 - dihydro - 1 - (o - chlorophenyl)indol - 4(5H) - one. This mixture is next reacted with hydrochloric acid in aqueous ethanol to give a product consisting entirely of 6,7-dihydro - 1 - (o - chlorophenyl) - indol - 4(5H) - one, M.P. 114–116° C., following treatment with Girard's T reagent (for use of this reagent in the purification of ketones, see Helvetica Chimica Acta, vol. 19, page 1095, 1936), trituration with 95% ethanol, and crystallization from ethyl acetate. This ketone intermediate is then reacted with zinc and methyl bromoacetate and the reaction product treated with sulfuric acid to give methyl 1 - (o - chlorophenyl) - 6,7 - dihydroindole-$\Delta^{4(5H),\alpha}$-acetate as an oil, which in turn is heated with sulfur in a nitrogen atmosphere at 155–200° C., and the initial product mixture treated with Raney nickel in benzene to give the desired methyl 1 - (o - chlorophenyl)indole-4 - acetate starting material; M.P. 72.5–75.5° C., following distillation, charcoal treatment of an ethanol solution of the distillate having B.P. 180–185° C./0.6 mm. Hg, evaporation of the treated solution, and trituration of the residue with cold methanol.

EXAMPLE 2

A mixture consisting of 9.05 g. of ethyl 2 - methyl - 1-phenylindole - 4 - acetate, 3 ml. of 50% aqueous sodium hydroxide, and 100 ml. of 95% ethanol is heated under reflux for 16 hours and then concentrated to near-dryness. The residue is treated with 150 ml. of water, and the aqueous mixture is extracted with ether and acidified with 70 ml. of cold 1 N hydrochloric acid. The 2 - methyl - 1 - phenylindole - 4 - acetic acid that precipitates is isolated, dried, and crystallized from aqueous methanol; M.P. 151–152.5° C.

To a solution of 2.65 g. of 2 - methyl - 1 - phenylindole - 4 - acetic acid in 25 ml. of hot ethanol is added 10 ml. of 1 N aqueous sodium hydroxide, and the resulting mixture is evaporated under reduced pressure to give 2-methyl - 1 - phenylindole - 4 - acetic acid sodium salt.

A solution of 1.4 g. of choline chloride in 10 ml. of methanol is added to 2.87 g. of 2 - methyl - 1 - phenylindole - 4 - acetic acid sodium salt in 50 ml. of methanol. The mixture is stirred for one hour, the insoluble sodium chloride is removed by filtration, and the filtrate is evaporated to dryness under reduced pressure to give 2 - methyl-1 - phenylindole - 4 -acetic acid choline salt.

By utilizing the foregoing procedures, starting with ethyl 1,2 - diphenylindole - 4 - acetate there are obtained 1,2 - diphenylindole - 4 - acetic acid, M.P. 223–225.5° C., following crystallization from ethyl acetate, and the sodium and choline salts thereof.

The ethyl 2 - methyl - 1 - phenylindole - 4 - acetate starting material is prepared as follows. Ethyl 6,7 - dihydro - 2 - methyl - 1 - phenylindole-$\Delta^{4(5H),\alpha}$-acetate, M.P. 119–121° C. following crystallization from ethanol, is prepared by reacting 6,7 - dihydro - 2 - methyl - 1 - phenylindol - 4(5H) - one with zinc and ethyl bromoacetate according to the procedure described in Example 1 above for the preparation of ethyl 6,7 - dihydro - 1 - phenylindole-$\Delta^{4(5H),\alpha}$-acetate. A mixture consisting of 21.7 g. of ethyl 6,7 - dihydro - 2 - methyl - 1 - phenylindole-$\Delta^{4(5H),\alpha}$-acetate, 27.1 g. of chloranil, and 110 ml. of toluene is heated under reflux for 8 hours, cooled and filtered. The filtrate is washed successively with 1 N aqueous sodium hydroxide, with water, and with saturated aqueous sodium chloride, dried, and concentrated to about 100 ml. This toluene solution is poured onto a chromatography column prepared from activated magnesium silicate (Florisil), from which the desired ethyl 2-methyl-1-phenylindole-4-acetate starting material is isolated as an oil that is purified further by distillation under reduced pressure; B.P. 182–201° C./0.8–0.6 mm. Hg.

The ethyl 1,2 - diphenylindole - 4 - acetate starting material is prepared in a similar manner by reacting 6,7-dihydro - 1,2 - diphenylindol - 4(5H) - one with zinc and ethyl bromoacetate to give ethyl 6,7 - dihydro - 1,2-diphenylindole-$\Delta^{4(5H),\alpha}$-acetate, M.P. 141.5–144° C., following crystallization from ethanol, and then dehydrogenating the latter compound by reaction with chloranil in refluxing toluene.

EXAMPLE 3

A mixture consisting of 9.0 g. of ethyl 1 - (o - chlorophenyl) - 2 - methylindole - 4 - acetate, 3.3 g. of potassium hydroxide, 15 ml. of water, and 85 ml. of absolute ethanol is kept at room temperature for 60 hours and evaporated. The solid residue is treated with 100 ml. of water, and the aqueous mixture is extracted with ether. To the alkaline aqueous solution is added 100 ml. of a 1:1 mixture of benzene-ether, and the resulting mixture is acidified with 60 ml. of 1 N hydrochloric acid. The two phase system is shaken thoroughly and the organic phase is separated, washed with water, dried, and evaporated to give 1 - (o - chlorophenyl) - 2 - methylindole - 4 - acetic acid; M.P. 171–173° C., following crystallization from methanol or benzene.

Utilizing the foregoing procedure, with only minor variations, the following 1-substituted-2-methylindole-4-acetic acid compounds are obtained from the hydrolysis of the designated esters:

(a) 1 - (m-chlorophenyl)-2-methylindole-4-acetic acid, M.P. 154–156° C., following successive crystallizations from ethyl acetate-hexane (once) and methanol (twice); from hydrolysis of methyl 1-(m-chlorophenyl)-2-methylindole-4-acetate with 50% aqueous sodium hydroxide in ethanol.

(b) 1-(2,3-dichlorophenyl)-2-methylindole - 4 - acetic acid, M.P. 182–184° C., following trituration of the initial solid product with cyclohexane, washing of the insoluble solid with petroleum ether, and crystallization successively from methanol, benzene, and methanol; from hydrolysis of methyl 1 - (2,3-dichlorophenyl)-2-methylindole-4-acetate with 50% aqueous sodium hydroxide in ethanol.

(c) 1-(2,4-dichlorophenyl)-2-methylindole - 4 - acetic acid, M.P. 169–172.5° C., following successive crystallizations from ethanol-water (with charcoal treatment) and ethyl acetate; from hydrolysis of methyl 1-(2,4-dichlorophenyl)-2-methylindole - 4 - acetate with 50% aqueous sodium hydroxide in ethanol.

The ethyl 1-(o-chlorophenyl)-2-methylindole-4-acetate starting material is prepared as follows.

A mixture consisting of 50.4 g. of 2-acetonyl-1,3-cyclohexanedione, 57.4 g. of o-chloroaniline, and 250 ml. of acetic acid is heated under reflux for 90 minutes, poured into 500 ml. of ice-cold water, and the resulting aqueous mixture is extracted with three 200-ml. portions of ether. The combined ether extracts are washed with 1 N hydrochloric acid, with water, and with saturated aqueous sodium chloride, dried, and evaporated to give a residue of 1-(o-chlorophenyl)-6,7-dihydro-2-methylindol-4(5H)-one; M.P. 126–128° C., following crystallization from cyclohexane.

A solution of 51.95 g. of the foregoing intermediate product and 66.8 g. of ethyl bromoacetate in 250 ml. of ether and 750 ml. of benzene is combined with 65.4 g. of zinc (activated by treatment with 1 N hydrochloric acid), and the resulting mixture is heated under reflux. After one hour, two additions of 13.0 g. each of zinc and 3.3 g. each of ethyl bromoacetate are made at 30-minute intervals, and the resulting mixture is heated under reflux for two hours more. Upon cooling, the reaction mixture is stirred well with 500 ml. of 10% sulfuric acid, and the organic phase is separated. The aqueous phase is extracted with ether, and the combined ether extracts and organic phase are washed with water until neutral, dried, and evaporated to give ethyl 1-(o-chlorophenyl)-6,7 - dihydro - 2 - methylindole-$\Delta^{4(5H),\alpha}$-acetate; M.P. 109–111.5° C., following crystallization from ethanol.

The unsaturated ester intermediate (38.8 g.) is dissolved in 200 ml. of xylene, 2 g. of 20% palladium-on-carbon is added, and the resulting mixture is heated under reflux for 12 hours. Upon cooling, the mixture is filtered, and the filtrate is distilled under reduced pressure. The fraction distilling at 180–185° C./0.5 mm. Hg is collected and purified by chromatography on a column prepared from activated magnesium silicate (Florisil). The desired ethyl 1-(o-chlorophenyl)-2-methylindole - 4 - acetate is obtained by eluting the column with benzene and with a 5% ether-in-benzene mixture and evaporating the combined eluates to dryness.

Utilizing procedures analogous to those described above, the following ester starting materials are obtained by way of the designated intermediates.

(1) Methyl 1-(m-chlorophenyl) - 2 - methylindole-4-acetate; obtained by first reacting 2-acetonyl-1,3 - cyclohexanedione with m-chloroaniline in benzene solution to give 1 - (m-chlorophenyl) - 6,7 - dihydro - 2 - methylindol-4(5H)-one, M.P. 161–163° C., following successive crystallizations from ethanol and benzene, and then reacting this intermediate with zinc and methyl bromoacetate and treating the reaction product with sulfuric acid to give methyl 1 - (m-chlorophenyl)-6,7-dihydro-2- methylindole-Δ⁴⁽⁵ᴴ⁾,ᵅ-acetate, obtained as an oil, which is heated with sulfur at 230–240° C., and the initial product mixture treated with Raney nickel in benzene to give the desired ester starting material as an oil that is suitable for use without further purification.

(2) Methyl 1-(2,3 - dichlorophenyl) - 2 - methylindole - 4 - acetate; obtained by first reacting 2 - acetonyl-1,3 - cyclohexanedione with 2,3-dichloroaniline in toluene solution to give 1 - (2,3-dichlorophenyl)-6,7-dihydro-2-methylindol-4(5H)-one, M.P. 130.5–132.5° C., following trituration with hot n-hexane and two crystallizations from methanol, and then reacting this intermediate with zinc and methyl bromoacetate and treating the reaction product with sulfuric acid to give methyl 1-(2,3-dichlorophenyl) - 6,7 - dihydro - 2 - methylindol-Δ⁴⁽⁵ᴴ⁾,ᵅ-acetate, obtained as an oil, which is heated under reflux in mesitylene with 20% palladium-on-carbon to give the desired ester starting material as an oil that is purified by chromatography on activated magnesium silicate, from which it is eluted with benzene-ether.

(3) Methyl 1 - (2,4 - dichlorophenyl)-2-methylindole-4-acetate; obtained by first reacting 2-acetonyl-1,3-cyclohexanedione with 2,4-dichloroaniline in the presence of p-toluenesulfonic acid in toluene solution to give 1-(2,4-dichlorophenyl) - 6,7 - dihydro-2-methylindol-4(5H)-one, M.P. 123.5–128° C., following crystallization from ethyl acetate with charcoal treatment, and then reacting this intermediate with zinc and methyl bromoacetate and treating the reaction product with sulfuric acid to give methyl 1 - (2,4 - dichlorophenyl) - 6,7-dihydro-2-methylindole-Δ⁴⁽⁵ᴴ⁾,ᵅ-acetate, M.P. 105–110° C., which is heated with sulfur over a range of 140–170° C., and the initial product mixture treated with Raney nickel in benzene to give the desired ester starting material as an oil that is suitable for use without further purification.

EXAMPLE 4

A mixture consisting of 15.6 g. of ethyl 1-(o-fluorophenyl)-2-methylindole-4-acetate, 6.6 g. of potassium hydroxide, 25 ml. of water, and 100 ml. of absolute ethanol is heated under reflux for two hours, kept at room temperature for 18 hours, and then evaporated to dryness. The solid residue is treated with 75 ml. of water, and the aqueous mixture is added slowly to 100 ml. of cold 1 N hydrochloric acid. The 1-(o-fluorophenyl)-2-methylindole-4-acetic acid that precipitates is isolated, dried, and crystallized twice from aqueous methanol; M.P. 153–154.5° C. (Resolidified melt had M.P. 160–162° C.)

The required ester starting material is prepared, utilizing procedures described in Example 3 above, by reacting 2-acetonyl-1,3-cyclohexanedione with o-fluoraniline in acetic acid to give 1-(o-fluorophenyl)-6,7-dihydro-2-methylindol-4(5H)-one, M.P. 105.5–107.5° C., following crystallization from aqueous methanol; further reacting this intermediate with zinc and ethyl bromoacetate and treating the reaction product with sulfuric acid to give ethyl 1-(o-fluorophenyl) - 6,7 - dihydro-2-methylindole-Δ⁴⁽⁵ᴴ⁾,ᵅ-acetate, M.P. 110–112.5° C., following crystallization from ethanol; and heating this unsaturated ester intermediate in the presence of 20% palladium-on-carbon in mesitylene to give the desired ethyl 1-(o-fluorophenyl)-2-methylindole-4-acetate starting material, isolated as an oil that is suitable for use without further purification.

EXAMPLE 5

A mixture consisting of 11.1 g. of methyl 1-(p-tolyl)indole-4-acetate, 5.3 g. of potassium hydroxide, 20 ml. of water, and 90 ml. of ethanol is kept at room temperature for 60 hours, concentrated to dryness, and the solid residue is treated with 100 ml. of water. The aqueous mixture is extracted with ether, acidified with concentrated hydrochloric acid, and the acidic mixture is extracted with ether. The ether extract is washed with water, dried, and evaporated to give 1-(p-tolyl)indole-4-acetic acid; M.P. 141–143° C., following crystallization from benzene.

Utilizing the foregoing procedure, with only minor variations, the following 1-substituted-indole-4-acetic acid compounds are obtained from the hydrolysis of the designated esters:

(a) 1-(o-tolyl)indole-4-acetic acid; from hydrolysis of methyl 1-(o-tolyl)indole-4-acetate. The initial product obtained is purified as follows. A warm, filtered solution of the acid product (11.8 g.) and diethanolamine (4.68 g.) in 100 ml. of acetone is diluted with 30 ml. of petroleum ether, the resulting mixture is cooled at about 0° C. overnight, and the solid diethanolamine salt of 1-(o-tolyl)indole-4-acetic acid that precipitates is isolated and dried; M.P. 125.5–127° C., following crystallization from a 3:1 ether-methanol mixture. A solution of this salt in 0.5 N sodium hydroxide is washed with ether, acidified with dilute hydrochloric acid, and the acidic mixture is extracted with ether. After drying, the ether extract is evaporated to give 1-(o-tolyl)indole-4-acetic acid, M.P. 136–137° C., following crystallization from benzene-hexane.

(b) 1 - (o - methoxyphenyl)indole-4-acetic acid, M.P. 148–150° C., following adsorption of the initial product on silica gel, elution with benzene-ether, and crystallization of the eluted solid from ethyl acetate; from hydrolysis of methyl 1-(o-methoxyphenyl)indole-4-acetate with 50% aqueous sodium hydroxide in ethanol.

The methyl 1-(p-tolyl)indole-4-acetate starting material is prepared as follows.

A solution of 30.7 g. of 4,5,6,7-tetrahydro-4-oxo-3-benzofurancarboxylic acid in 73.0 g. of p-toluidine is heated at 170° C. in a nitrogen atmohphere for 16 hours, and then poured into 400 ml. of 5 N hydrochloric acid. The 4,5,6,7-tetrahydro-1-(p-tolyl)-4-(p-tolylimino)indole hydrochloride that precipitates is isolated, triturated with benzene to remove most of the color, and crystallized from isopropyl alcohol; M.P. 245–249° C.

A mixture consisting of 17.6 g. of 4,5,6,7-tetrahydro-1-(p-tolyl)-4-(p-tolylimino)indole hydrochloride, 75 ml. of 1 N hydrochloric acid, and 175 ml. of 95% ethanol is heated on a steam bath for one hour, diluted with 75 ml. of water and cooled overnight to give 6,7-dihydro-1-(p-tolyl)indole-4(5H)-one, isolated as long tan needles; M.P. 114–116° C.

A mixture consisting of 16.3 g. of 6,7-dihydro-1-(p-tolyl)-indol-4(5H)-one and 22.2 g. of methyl bromoacetate in 80 ml. of ether and 240 ml. of benzene is combined with 23.7 g. of zinc (activated by treatment with 1 N hydrochloric acid), and the resulting mixture is heated under reflux. After one hour, four additions of 5.9 g. each of zinc and 2.75 g. each of methyl bromoacetate are made at 40-minute intervals, and the resulting mixture is heated under reflux for one hour more. Upon cooling, the reaction mixture is stirred well with 200 ml. of 10% sulfuric acid for 15 minutes, and the organic phase is separated. The aqueous phase is extracted with ether, and the combined ether extracts and organic phase are washed with water until neutral, dried, and evaporated to give methyl 6,7-dihydro-1-(p-tolyl)indole-Δ⁴⁽⁵ᴴ⁾,ᵅ-acetate; M.P. 132.5–135° C., following two crystallizations from methanol.

The unsaturated ester intermediate (11.2 g.) is dissolved in 100 ml. xylene, 1.1 g. of 20% palladium-on-carbon is added, and the resulting mixture is heated under reflux for 16 hours. After cooling and filtration, the filtrate is evaporated to give methyl 1-(p-tolyl)-indole-4-acetate, obtained as an oil that is suitable for use without further purification.

The methyl 1-(o-tolyl)indole-4-acetate and methyl 1-(o-methoxyphenyl)indole-4-acetate starting materials are prepared employing procedures analogous to those described above and those described earlier with appropriate choices of reactants.

EXAMPLE 6

A mixture consisting of 8.2 g. of ethyl α-methyl-1-phenylindole-4-acetate, 3.3 g. of potassium hydroxide, 10 ml. of water and 50 ml. of ethanol is kept at room temperature for 60 hours, concentrated, and diluted with 80 ml. of water. The aqueous mixture is acidified with dilute hydrochloric acid, and the α-methyl-1-phenylindole-4-acetic acid that precipitates is isolated, dried, and crystallized from benzene-hexane; M.P. 146–147.5° C.

A solution of 11.0 g. of α-methyl-1-phenylindole-4-acetic acid in 100 ml. of hot acetone is treated with 4.36 g. of diethanolamine and the resulting mixture is cooled and diluted to saturation with petroleum ether. The diethanolamine salt of α-methyl-1-phenylindole-4-acetic acid that crystallizes is isolated, dried, and re-crystallized successively from acetone-petroleum ether and from methanol-ether; M.P. 133–135° C.

By utilizing the foregoing procedure, with the substitution of methyl α-ethyl-1-phenylindole-4-acetate for the ethyl α-methyl-1-phenylindole-4-acetate, there is obtained α-ethyl-1-phenylindole-4-acetic acid; M.P. 116–118° C., following crystallization from isopropyl ether.

The ethyl α-methyl-1-phenylindole-4-acetate starting material is prepared, utilizing procedures described earlier herein, by first reacting 6,7 - dihydro-1-phenylindole-4(5H)-one with zinc and ethyl α-bromopropionate, treating the reaction mixture with sulfuric acid and then dehydrogenating the product obtained, which is a mixture consisting of ethyl 6,7-dihydro-α-methyl-1-phenylindole-4-acetate and ethyl 6,7-dihydro-α-methyl-1-phenylindole-$\Delta^{4(5H),\alpha}$-acetate, by heating it in mesitylene solution in the presence of 20% palladium-on-carbon.

The methyl α-ethyl-1-phenylindole-4-acetate is prepared similarly by substituting methyl α-bromobutyrate for the ethyl α-bromopropionate in the first reaction mentioned above.

EXAMPLE 7

By utilizing the procedure described in Example 6 above, 18.7 g. of ethyl α,2-dimethyl-1-phenylindole-4-acetate is hydrolyzed to give α,2-dimethyl-1-phenylindole-4-acetic acid, purified as follows. A solution of the crude acid in carbon tetrachloride is poured onto a silica gel chromatography column, the column is eluted with a 10% ether-in-benzene mixture, the combined eluates are evaporated, and the solid obtained is crystallized from aqueous methanol; M.P. 129–130° C. (From benzene-hexane; M.P. 132–135° C.)

A mixture of 2.79 g. of the acid in 30 ml. of acetone is treated with a solution of 1.05 g. of diethanolamine in 20 ml. of acetone. The resulting mixture is stirred at room temperature for 10 minutes, diluted with 30 ml. of petroleum ether, and kept at room temperature overnight to give the diethanolamine salt of α,2-dimethyl-1-phenylindole-4-acetic acid, which is isolated by filtration and dried; M.P. 164–166° C.

The required ester starting material is prepared, utilizing procedures described earlier herein, by first reacting 6,7-dihydro-2-methyl-1-phenylindol-4(5H)-one with zinc and ethyl α-bromopropionate and treating the reaction mixture with sulfuric acid to give a mixture of unsaturated ester intermediates, which is dehydrogenated by heating in mesitylene solution in the presence of 20% palladium-on-carbon.

EXAMPLE 8

Utilizing the procedure described in Example 6 above, from the hydrolysis of 9.6 g. of methyl 3-methyl-1-phenyl-indole-4-acetate there is obtained 3-methyl-1-phenylindole-4-acetic acid; M.P. 140–148.5° C., following successive crystallizations from ethanol and from benzene.

The ester starting material is prepared as follows. A solution of 32.1 g. of 4,5,6,7-tetrahydro-3-methyl-4-oxo-2-benzofurancarboxylic acid in 100 ml. of aniline is heated under reflux in a nitrogen atmosphere for 3 hours, cooled, and poured into a mixture of 80 ml. of concentrated hydrochloric acid and 100 ml. of iced water. The acidic aqueous mixture is extracted with chloroform, and the chloroform extracts are washed with 0.5 N sodium hydroxide and with water, dried, and evaporated. The oily residue is triturated with ether and the solid 4,5,6,7-tetrahydro-3-methyl-1-phenyl - 4 - (phenylimino)indole that forms is crystallized from ethanol; M.P. 105–107° C. This iminoindole intermediate (34.6 g.) is hydrolyzed by reaction with hydrochloric acid in ethanol and the 6,7-dihydro-3-methyl-1-phenylindol-4(5H)-one product, M.P. 113.5–115.5° C., following crystallization from ethanol, is reacted with zinc and methyl bromoacetate and the reaction mixture treated with sulfuric acid to give methyl 6,7-dihydro-3-methyl-1 - phenylindole - $\Delta^{4(5H),\alpha}$ - acetate, M.P. 122.5–124° C., following crystallization from methanol, which is dehydrogenated by heating in mesitylene solution in the presence of 20% palladium-on-carbon to give the desired methyl 3-methyl-1 - phenyl - indole - 4-acetate, M.P. 82.5–84° C., following crystallization from methanol; all according to analogous procedures described earlier herein.

EXAMPLE 9

A mixture consisting of 9.75 g. of methyl 1-cyclohexyl-indole-4-acetate, 4.62 g. of potassium hydroxide, 15 ml. of water, and 75 ml. of ethanol is heated under reflux for 4 hours, cooled, concentrated, and the residue treated with 100 ml. of water. The aqueous mixture is extracted twice with ether, acidified with dilute hydrochloric acid, and the acidic aqueous mixture is extracted with ether. The ether extract is washed with water, dried, and evaporated to give 1-cyclohexylindole-4-acetic acid; M.P. 83–86° C., following successive crystallizations from cyclohexane and from ethyl acetate-n-hexane.

The ester starting material is prepared as follows. A solution of 36.0 g. of 4,5,6,7-tetrahydro-4-oxo-3-benzofurancarboxylic acid in 79.35 g. of cyclohexylamine is heated under reflux for 3 hours, cooled overnight, and poured into a cold solution of 67 ml. of concentrated hydrochloric acid in 150 ml. of water. The 1-cyclohexyl-6,7-dihydroindol-4(5H)-one that precipitates is isolated, dried, and crystallized from cyclohexane; M.P. 106–107° C. A solution of 31.2 g. of 1-cyclohexyl-6,7-dihydroindol-4(5H)-one and 43.8 g. of methyl bromoacetate in 150 ml. of ether and 450 ml. of benzene is combined with 46.8 g. of zinc (20 mesh; activated by treatment with 1 N hydrochloric acid), and the resulting mixture is stirred and heated under reflux for a total period of four hours. After one hour, 300 ml. of 1,2-dimethoxyethane is added to dissolve any oily precipitate that forms, and four additions of 12.2 g. each of zinc and 5.5 g. each of methyl bromoacetate are made at 40-minute intervals. If required, additional 1,2-dimethoxyethane is added during the heating period. Upon cooling, the reaction mixture is stirred with 400 ml. of 10% sulfuric acid, the organic phase is separated, and the acidic aqueous phase is extracted with ether. The combined ether extracts and organic phase are washed with water until neutral, dried, and evaporated to give methyl 1-cyclohexyl-6,7-dihydroindole - $\Delta^{4(5H),\alpha}$-acetate; M.P. 110–112° C., following two crystallizations from methanol. A mixture consisting of this unsaturated ester intermediate (10.0 g.), 1.0 g. of 20% palladium-on-carbon, and 100 ml. of mesitylene is heated under reflux for 5 hours, cooled to room temperature, filtered, and the filtrate evaporated to give the desired methyl 1-cyclohexylindole-4-acetate, isolated as a pale yellow oil that is suitable for use without further purification.

EXAMPLE 10

Utilizing the general hydrolysis procedure described earlier herein, the following 1-(fluorophenyl)indole - 4-acetic acid compounds are obtained from the hydrolysis of the designated esters with 50% aqueous sodium hydroxide in ethanol.

(a) 1-(o - fluorophenyl)indole - 4 - acetic acid, from methyl 1-(o-fluorophenyl)indole-4-acetate; isolated as the diethanolamine salt as follows. The initial oily acid product in benzene is adsorbed on a silica gel chromatography column, from which it is eluted with 10:1 and 5:1 benzene-ether mixtures. The combined residue obtained upon evaporation of the eluates is dissolved in acetone, the solution is filtered, and the filtrate is treated with a solution of an equivalent amount of diethanolamine in a small volume of acetone. The mixture is heated briefly, petroleum ether is added, the mixture is heated again until homogeneous, and it is then cooled. The solid diethanolamine salt of 1-(o-fluorophenyl)indole - 4 - acetic acid that precipitates is isolated and purified by successive crystallizations from methanol-ether and benzene; M.P. 107–108.5° C.

(b) 1-(p - fluorophenyl)indole - 4 - acetic acid, from methyl 1-(p-fluorophenyl)indole-4-acetate; isolated as the free acid as follows. The initial oily product in benzene is adsorbed on silica gel, from which it is eluted with 20:1 and 10:1 benzene-ether mixtures. The combined residue from evaporation of the eluates is then successively crystallized from benzene-cyclohexane, benzene, and ethyl acetate to give the purified 1-(p-fluorophenyl)indole-4-acetic acid product; M.P. 151.5–153.5° C.

The ester starting materials are obtained from the reactions indicated below, utilizing procedures described earlier herein for the preparation of similar compounds.

(1) Methyl 1 - (o - fluorophenyl)indole - 4 - acetate; obtained by first reacting 4,5,6,7 - tetrahydro - 4 - oxo-3 - benzofurancarboxylic acid with o-fluoroaniline to give, after acidic hydrolysis of the initial reaction product mixture, 6,7 - dihydro - 1 - (o - fluorophenyl) - indol-4(5H)-one, M.P. 68–71° C., following crystallization from cyclohexane; next reacting this intermediate ketone with zinc and methyl bromoacetate and treating the reaction product with sulfuric acid to give methyl 6,7-dihydro - 1 - ( o - fluorophenyl)indole - $\Delta^{4(5H),\alpha}$ - acetate; and finally heating this second intermediate with sulfur and treating the initial product mixture with Raney nickel in benzene to give the desired ester starting material as an oil that is suitable for use without further purification.

(2) Methyl 1 - (p - fluorophenyl)indole - 4 - acetate; obtained by first reacting 4,5,6,7 - tetrahydro - 4 - oxo-3-benzofurancarboxylic acid with p-fluoroaniline to give, following acidic hydrolysis of the initial product mixture, 6, 7 - dihydro - 1 - (p - fluorophenyl)indol - 4(5H)-one, M.P. 107–110° C., following trituration with ether; next reacting this intermediate ketone with zinc and methyl bromoacetate and treating the reaction product with sulfuric acid to give methyl 6,7 - dihydro - 1 - (p - fluorophenyl)indole - $\Delta^{4(5H),\alpha}$ - acetate, M.P. 178–180° C., following two crystallizations from ethyl acetate; and finally dehydrogenating this second intermediate with sulfur to give the desired ester starting material as an oil that is used without further purification.

EXAMPLE 11

Utilizing the general hydrolysis procedure described earlier herein, the following 1 - phenylindole - 4 - acetic acid compounds are obtained from the hydrolysis of the designated esters.

(a) 5 - methyl - 1 - phenylindole - 4 - acetic acid, from hydrolysis of ethyl 5 - methyl - 1 - phenylindole-4-acetate with potassium hydroxide in aqueous methanol; isolated as the free acid following purification by chromatography on silica gel, as described in Example 10 (b) above, and crystallization from benzene-petroleum ether; M.P. 167–169.5° C.

(b) 6 - methyl - 1 - phenylindole - 4 - acetic acid, from hydrolysis of methyl 6 - methyl - 1 - phenylindole-4-acetate with 50% aqueous sodium hydroxide in ethanol; isolated, following the procedure described in (a) of Example 5 herein, initially as the diethanolamine salt, M.P. 119–121° C. (crystallized from methanol-ether), and then, upon decomposition of this salt, as the free acid, M.P. 100–102° C., following crystallization from cyclohexane.

The ester starting materials are obtained as follows.

(1) Ethyl 5 - methyl - 1 - phenylindole - 4 - acetate. A sodium hydride dispersion (53% in mineral oil; 35.61 g.) is washed several times with petroleum ether to remove the oil and is then suspended in 250 ml. of benzene containing 142.03 g. of diethyl carbonate. To the well-stirred resulting mixture are added one ml. of ethanol and, dropwise over a one-hour period, a solution of 52.12 g. of 6,7 - dihydro - 1 - phenylindol - 4(5H) - one in 250 ml. of benzene, and the reaction mixture is heated under reflux for 90 minutes. It is then cooled to about 50° C., 120.0 g. of methyl iodide is added dropwise, and the new mixture is heated under reflux for 3 hours, cooled, and carefully treated with 250 ml. of 50% aqueous acetic acid. After further dilution with water, the mixture is extracted well with ether and with benzene, and the combined extracts are washed with saturated aqueous sodium bicarbonate until basic and then with saturated aqueous sodium chloride, dried, and evaporated to give a solid residue, which is slurried with a small amount of ethanol, cooled overnight, and the slurry filtered to give 6,7-dihydro- 5 - methyl - 5 - carbethoxy - 1 - phenylindol-4(5H)-one; M.P. 146–147° C. A mixture consisting of 28.81 g. of this intermediate, 100 ml. of ethylene glycol, and an aqueous solution of 11.76 g. of potassium hydroxide is heated under reflux for 90 minutes, cooled, filtered, and the solid 6,7 - dihydro - 5 - methyl - 1 -phenylindol - 4(5H) - one that is isolated is washed well with water and dried; M.P. 141–143° C. This ketone intermediate is then reacted with zinc and ethyl bromoacetate and the reaction product treated with sulfuric acid to give ethyl 6,7 - dihydro- 5 - methyl - 1 - phenylindole-$\Delta^{4(5H),\alpha}$-acetate as an oil, which in turn is dehydrogenated by heating it with sulfur and treating the initial product mixture with Raney nickel, utilizing procedures described earlier herein, to give the desired ethyl 5 - methyl -1-phenylindole - 4 - acetate starting material as an oil that is used directly without further purification.

(2) Methyl 6-methyl-1-phenylindole-4-acetate. This starting material is obtained by first reacting 4,5,6,7-tetrahydro-6-methyl-4-oxo-3-benzofurancarboxylic acid (M.P. 127–129.5° C., following crystallization from aqueous ethanol; obtained from the reaction of 5-methyl-1,3-cyclohexanedione with bromopyruvic acid according to the procedure reporated in Ann., vol. 655, page 20, 1962, for the preparation of similar compounds) with aniline to give, following acidic hydrolysis of the initial product mixture, 6,7-dihydro-6-methyl-1-phenylindol-4(5H)-one, M.P. 123–127° C., following successive crystallizations from ethyl acetate-hexane and cyclohexane; next reacting this intermediate ketone with zinc and methyl bromoacetate and treating the reacting product with sulfuric acid to give methyl 6,7-dihydro-6-methyl-1-phenylindole-$\Delta^{4(5H),\alpha}$-acetate, M.P. 103–106° C., following treatment of the crude product with Girard's T reagent and two crystallizations from methanol; and finally dehydrogenating this last intermediate by heating with 20% palladium-on-carbon in mesitylene to give the desired methyl 6-methyl-1-phenylindole-4-acetate starting material as an oil that is suitable for use without further purification.

EXAMPLE 12

A mixture consisting of 2.3 g. of ethyl 1-phenyl-4-indolineacetate, 44.4 ml. of absolute ethanol, and 20.7 g. of 50% aqueous sodium hydroxide is heated under reflux for 2 hours and then concentrated to remove ethanol. The residue is diluted with 50 ml. of water, and the aqueous mixture is extracted with ether and acidified with dilute hydrochloric acid to precipitate 1-phenyl-4-indolineacetic acid, which is isolated, dried, and crystallized successively from aqueous ethanol and benzene; M.P. 158–161° C.

The ester starting material is prepared as follows. A mixture consisting of 2.003 g. of 1-phenylindole-4-acetic acid, 37.5 ml. of 95% ethanol, 37.5 ml. of 48–50% fluoboric acid, and 0.107 g. of platinum oxide is shaken with hydrogen at an initial pressure of 50 lbs./in.² for 101 minutes at room temperature. The mixture is then diluted with 500 ml. of water, and the aqueous mixture is made alkaline with 2 N sodium hydroxide. The alkaline mixture is extracted with ether, and the ether extract is washed with water, dried, and evaporated to give the desired ethyl 1-phenyl-4-indolineacetate, isolated as an oil that is suitable for use without further purification.

What is claimed is:

1. A member of the class consisting of 1-substituted-indole-4-acetic acid compounds having the formula

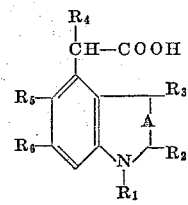

and pharmaceutically-acceptable salts thereof; where $R_1$ is a member of the class consisting of phenyl, mono-(halo)phenyl, 2,3-dichlorophenyl, 2,4-dichlorophenyl, mono(lower alkyl)phenyl, methoxyphenyl, and cyclohexyl; $R_2$ is a member of the class consisting of hydrogen, lower alkyl, and phenyl; $R_4$ is a member of the class consisting of hydrogen and lower alkyl; each of $R_3$, $R_5$, and $R_6$ is a member of the class consisting of hydrogen and methyl, with the further provisio that not more than one of $R_3$, $R_5$, and $R_6$ is methyl; and A is a member of the class consisting of a single bond and a double bond.

2. A compound according to claim 1 which is 1-phenylindole-4-acetic acid.

3. A compound according to claim 1 which is α-methyl-1-phenylindole-4-acetic acid.

4. A compound according to claim 1 which is 1-(o-chlorophenyl)indole-4-acetic acid.

5. A compound according to claim 1 which is 1-(o-fluorophenyl)indole-4-acetic acid.

6. A compound according to claim 1 which is α,2-dimethyl-1-phenylindole-4-acetic acid.

References Cited

UNITED STATES PATENTS 3,271,413    9/1966    Shen et al. _____ 260—310

ALEX MAZEL, Primary Examiner

J. A. NARCAVAGE, Assistant Examiner

U.S. Cl. X.R.

260—326.11, 326.15, 326.16; 424—274